UNITED STATES PATENT OFFICE.

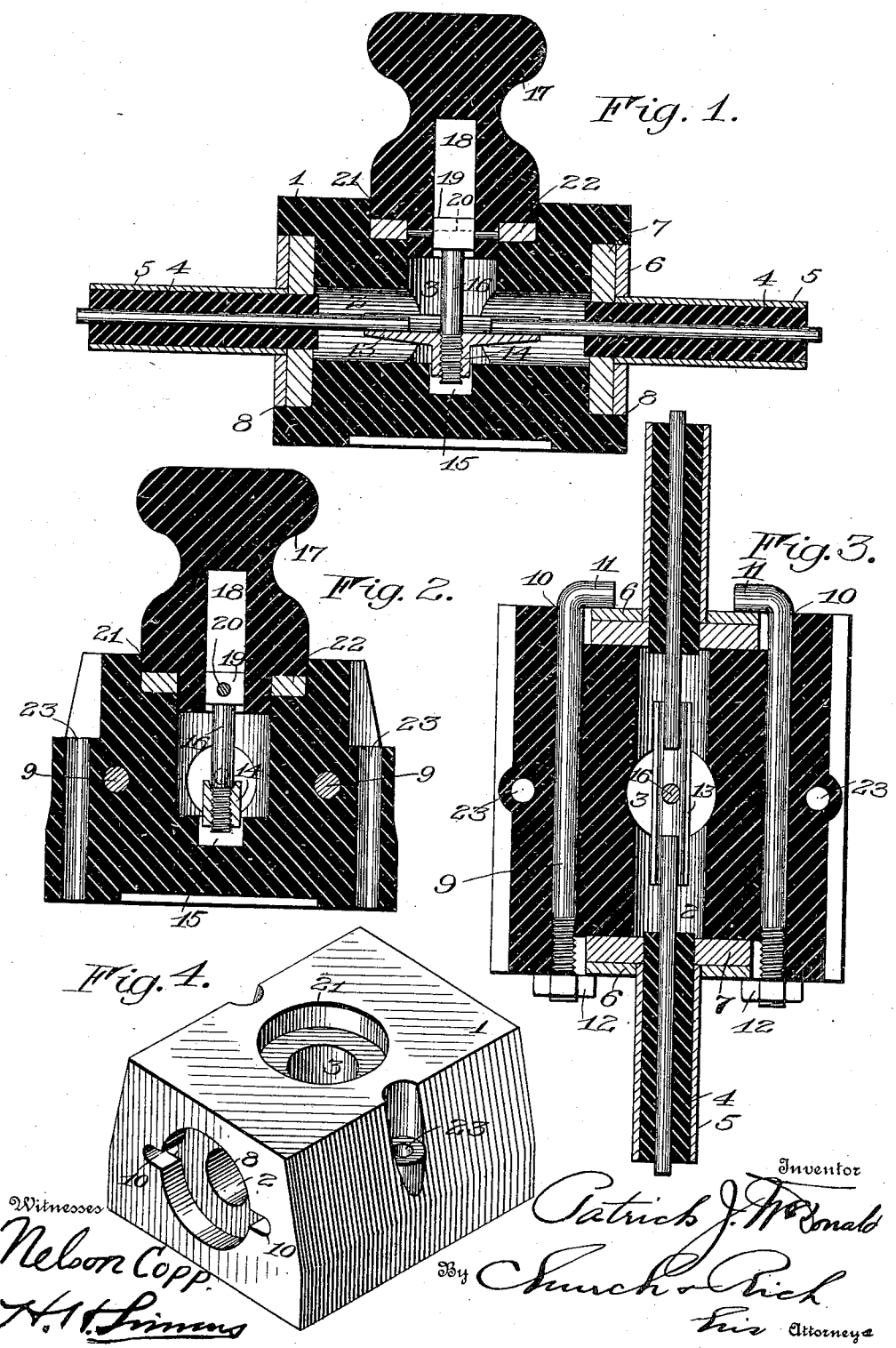

PATRICK J. McDONALD, OF ROCHESTER, NEW YORK, ASSIGNOR OF ONE-HALF TO GEORGE H. SMITH, OF ROCHESTER, NEW YORK.

TEST-COUPLING FOR ELECTRIC CONDUCTORS.

966,400.  Specification of Letters Patent.  Patented Aug. 2, 1910.

Application filed June 20, 1908, Serial No. 439,510.  Renewed January 5, 1910.  Serial No. 536,484.

*To all whom it may concern:*

Be it known that I, PATRICK J. McDONALD, of Rochester, in the county of Monroe and State of New York, have invented certain new and useful Improvements in Test-Couplings for Electric Conductors; and I do hereby declare the following to be a full, clear, and exact description of the same, reference being had to the accompanying drawings, forming a part of this specification, and to the reference-numerals marked thereon.

The present invention relates to test couplings for electrical conductors, and it has for an object to provide a coupling which will do away with the necessity of destroying the joint between two sections of a conductor, such as those employed in subways, in order to locate a leak in a circuit.

To this and other ends the invention consists in certain improvements and combinations of parts all as will be hereinafter more fully described, the novel features being pointed out in the claims at the end of the specification.

In the drawings; Figure 1 is a vertical longitudinal section of one embodiment of the invention; Fig. 2 is a vertical transverse section of the same embodiment; Fig. 3 is a horizontal section; and Fig. 4 is a perspective view of the device with the closure removed.

Subways for underground circuits are, as is well known, provided at intervals with manholes in which the joints or couplings between the conductor sections are located. These joints or couplings not only employ a certain amount of material which is wasted when the joint is destroyed, but an appreciable amount of labor is required for their formation. To test the circuit, in order to ascertain the location of a leak, it has been necessary to destroy these joints and then to reform them, thereby making the testing of an underground circuit a very expensive operation. With this invention the joints or couplings are formed but once and a test may be made of any conductor section at any time with little or no labor. If desired it may be made water-proof so that should the manholes fill with water the interior parts of the coupling will not be affected.

In the preferred embodiment of my invention I employ a casing or base 1 which may be made wholly of insulating material. The conductor sections lead into opposite walls of the casing and the latter is for this purpose provided with longitudinal bores 2 which are alined and lead from opposite sides of a vertical chamber or bore 3. In order to prevent water passing about the conductor sections and entering the casing, I secure to the lead tube 5, that surrounds and protects the insulation 4, a flange 6 to abut a rubber or other yielding washer or ring 7 that is located about the outer end of each bore 2, said washer being preferably positioned within a depression or seat 8 formed in the casing about a bore 2. The diameter of the opening in the ring 7 is slightly smaller than the diameter of the insulation so that the ring may yield to permit the uncovered projecting portion of the insulation to enter it, but at the same time form a water tight joint.

The projecting insulating portion of each conductor may be forced into its ring and the washer clamped against the casing by tie rods 9 which may lie in parallel bores 10 in the casing and have heads 11 at one end to engage one of the flanges 6, their other ends having screw threads with which engage nuts 12 that hold the other flange 6 against its washer. Each conductor preferably has the insulation stripped from its ends and with these ends may engage an electrical connector 13 which may have grooves to receive the stripped ends. This connector is guided vertically within the casing and for this purpose has a depending projection 14 which enters a pocket 15 at the bottom of the chamber 3. Normally this connector lies below the projecting ends to break the circuit from one conductor section to the other, and in order to move it to establish connection between them I may employ a screw 16 working in the connector and projecting upwardly therefrom in the chamber 3. The operating device for the connector is preferably secured to a closure 17 which for this purpose may be formed with a squared bore 18 in which is secured the head 19 by a pin 20. In this manner, the closure is also held tightly in place.

The closure for the casing is preferably on the form of a rotatable plug, made of insulating material, in order that it may be moved to operate the connector 13, and the top of the casing around the vertical chamber 3 has a circular seat or depression 21 to receive a rubber or yielding washer 22 so that a tight joint between the plug and the casing is obtained to exclude water at this point.

The device may be secured in any suitable manner as by screws passing through vertical bores 23 in the base.

To test a circuit the closure is rotated thereby withdrawing screw 16 from connector 13 which drops and breaks connection with the adjacent conductor sections, and a suitable testing apparatus is then connected to one of the terminals within the coupling. The connection may be again established by inserting the closure and rotating it in the proper direction.

The coupling is inexpensive to manufacture and simple to install and to operate. It reduces the cost of testing electrical circuits by dispensing with the labor of reforming the connection between conductor sections after each test, and it thereby enables repairs to circuits to be made much quicker. It is adapted for use in underground telephone, or electric lighting circuits or for any other circuits where similar conditions exist.

What I claim is:

1. The combination with an insulating casing having a chamber and openings in the walls thereof leading to the chamber, of conductor sections leading to the chamber through the openings, means for making and breaking electrical connection between the ends of the conductor sections, and a removable closure for the chamber connected to said means for causing the latter to make and break connection.

2. The combination with an insulating casing having a chamber and openings in the walls of the casing leading to the chamber, of conductor sections leading to the chamber through the openings, a movable closure for the chamber, means for making and breaking electrical connection between the ends of the conductor sections, packing for the openings through which the conductor sections pass, and means for compressing the packing about the conductor sections to exclude water and moisture from the chamber.

3. The combination with a pair of conductor sections, having flanges secured to their adjacent ends, of an insulating base having a pair of bores and a chamber communicating with said bores, packing rings surrounding the pair of bores, means for clamping the flanges against the rings, a removable closure for the vertical chamber, and means for making and breaking electrical connection between the ends of the conductor sections.

4. The combination with an insulating casing having bores in walls thereof and a chamber with which the bores communicate, of a removable closure for the chamber packing rings surrounding the outer ends of the bores, flanges to be secured to the conductor sections, tie rods extending through the casing to hold the flanges against the packing rings, and means for making and breaking electrical connection between the ends of the conductor sections.

5. The combination with an insulating casing having bores, pockets or seats at the outer ends of the bores, and a chamber communicating with the bores, of yielding washers in said pockets or seats, flanges for bearing against the washers, tie rods connecting said flanges, and means for making and breaking electrical connection between the ends of the conductor sections.

6. The combination with an insulating casing, having a pair of bores, and a chamber communicating with the bores, of means for making and breaking electrical connection between the conductor sections leading into the bores, means for closing the bores about the conductor sections to exclude water from the casing, and a rotary closure for the vertical chamber, having connection with the means for making and breaking connection between the conductor sections for effecting such making and breaking.

7. The combination with an insulating casing having openings in walls thereof and a chamber communicating with said openings, of a closure for the chamber and the screw carried by the closure for effecting connection between two conductor sections leading through the openings.

8. The combination with an insulating casing having bores in opposite walls, and a chamber connecting the bores, of an electrical connector within the casing for connecting conductor sections leading through the bores, and a rotary closure for the casing carrying a screw to engage the connector and move it to establish electrical connection between the conductor sections.

9. The combination with an insulating casing, having bores in opposite walls and a chamber connecting the bores, of an electrical connector guided vertically in the casing, and a rotary closure for the chamber carrying a screw to engage the connector and move it to establish electrical connection between the conductor sections.

10. The combination with an insulating casing having bores in opposite walls for the conductor sections, and a chamber with which the bores communicate, of means for closing the bores about the conductor sections to exclude water, an electrical connector arranged within the casing, a rotary closure for the chamber carrying a screw for moving the connector to establish connection with the conductor sections, and a packing ring between the closure and the casing.

PATRICK J. McDONALD.

Witnesses:
 RUSSELL B. GRIFFITH,
 HAROLD H. SIMMS.